United States Patent
Sheng et al.

(10) Patent No.: US 11,386,108 B2
(45) Date of Patent: Jul. 12, 2022

(54) MINING DATA TRANSFORMATION FLOWS IN SPREADSHEETS

(71) Applicant: INTERNATIONAL BUSINESS MACHINES CORPORATION, Armonk, NY (US)

(72) Inventors: Yeh-Heng Sheng, Cupertino, CA (US); Xiaoyan Pu, Chelmsford, MA (US); Yong Li, Newton, MA (US); Ryan Pham, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 480 days.

(21) Appl. No.: 16/209,325

(22) Filed: Dec. 4, 2018

(65) Prior Publication Data

US 2020/0175027 A1    Jun. 4, 2020

(51) Int. Cl.
*G06F 16/00* (2019.01)
*G06F 16/25* (2019.01)
*G06F 16/26* (2019.01)
*G06F 40/18* (2020.01)

(52) U.S. Cl.
CPC ............ *G06F 16/254* (2019.01); *G06F 16/26* (2019.01); *G06F 40/18* (2020.01); *G06F 2216/03* (2013.01)

(58) Field of Classification Search
CPC ........ G06F 16/254; G06F 40/18; G06F 16/26; G06F 2216/03
See application file for complete search history.

(56) References Cited

U.S. PATENT DOCUMENTS

| | | | |
|---|---|---|---|
| 8,656,348 B2 | 2/2014 | Smialek | |
| 9,710,529 B2 | 7/2017 | Singh et al. | |
| 2011/0047525 A1* | 2/2011 | Castellanos | G06F 16/283 717/104 |
| 2012/0054147 A1* | 3/2012 | Goetz | G06F 16/254 707/602 |
| 2012/0089562 A1 | 4/2012 | Deremigio et al. | |
| 2012/0159465 A1* | 6/2012 | Mital | G06F 8/34 717/156 |
| 2015/0026114 A1 | 1/2015 | Triff | |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

*Primary Examiner* — Tyler J Torgrimson
(74) *Attorney, Agent, or Firm* — Rakesh Roy; Matthew M. Hulihan; Heslin Rothenberg Farley & Mesiti PC

(57) ABSTRACT

Mining data transformation flows in spreadsheets includes identifying operations defined in a spreadsheet, identifying source data, in the spreadsheet, on which the operations operate, automatically creating an extract, transform, load (ETL) data transformation flow, and executing the created ETL data transformation flow. Creating the ETL data transformation flow includes selecting, in the ETL system, source data endpoint(s) for data extraction, selecting target data endpoint(s) for data loading, mapping at least one of the identified operations to ETL operation(s) for data transformation, and building the ETL data transformation flow, which defines extraction from the selected source data endpoint(s), transformation based on the ETL operation(s), and loading to the selected target data endpoint(s).

20 Claims, 10 Drawing Sheets

| | A | B | C | D | E | F | G | H | I | J | K | L | M | N | O |
|---|---|---|---|---|---|---|---|---|---|---|---|---|---|---|---|
| 1 | Region | January | February | March | April | May | June | July | August | September | October | November | December | | |
| 2 | NA | $250,000 | $240,000 | $280,000 | $390,000 | $340,000 | $330,000 | $330,000 | $305,000 | $294,500 | $305,000 | $310,000 | $340,000 | | |
| 3 | LA | $125,000 | $115,000 | $155,000 | $165,000 | $215,000 | $205,000 | $205,000 | $180,000 | $169,500 | $180,000 | $185,000 | $215,000 | | |
| 4 | AF | $50,000 | $40,000 | $80,000 | $90,000 | $140,000 | $130,000 | $130,000 | $105,000 | $94,500 | $105,000 | $110,000 | $140,000 | | |
| 5 | EU | $220,000 | $210,000 | $250,000 | $260,000 | $310,000 | $300,000 | $300,000 | $275,000 | $264,500 | $275,000 | $280,000 | $310,000 | | |
| 6 | AS | $300,000 | $290,000 | $330,000 | $340,000 | $390,000 | $380,000 | $380,000 | $355,000 | $344,500 | $355,000 | $360,000 | $390,000 | | |
| 7 | OC | $70,000 | $60,000 | $100,000 | $110,000 | $160,000 | $150,000 | $150,000 | $125,000 | $114,500 | $125,000 | $160,000 | $160,000 | | |
| 8 | | | | | | | | | | | | | | | |
| 9 | | | | | | | | | | | | | | | |
| 10 | | | | | | | | | | | | | | | |
| 11 | | | | | | | | | | | | | | | |

FIG. 2A

| | A | B | C | D | E | F | G | H | I | J | K | L | M | N | O |
|---|---|---|---|---|---|---|---|---|---|---|---|---|---|---|---|
| 1 | Region | January | February | March | April | May | June | July | August | September | October | November | December | Annual Revenue | |
| 2 | NA | $250,000 | $240,000 | $280,000 | $290,000 | $340,000 | $330,000 | $330,000 | $305,000 | $294,500 | $305,000 | $310,000 | $340,000 | $3,614,500 | |
| 3 | LA | $125,000 | $115,000 | $155,000 | $165,000 | $215,000 | $205,000 | $205,000 | $180,000 | $169,500 | $180,000 | $185,000 | $215,000 | $2,114,500 | |
| 4 | AF | $50,000 | $40,000 | $80,000 | $90,000 | $140,000 | $130,000 | $130,000 | $105,000 | $94,500 | $105,000 | $110,000 | $140,000 | $1,214,500 | |
| 5 | EU | $220,000 | $210,000 | $250,000 | $260,000 | $310,000 | $300,000 | $300,000 | $275,000 | $264,500 | $275,000 | $280,000 | $310,000 | $3,254,500 | |
| 6 | AS | $300,000 | $290,000 | $330,000 | $340,000 | $390,000 | $380,000 | $380,000 | $355,000 | $344,500 | $355,000 | $360,000 | $390,000 | $4,214,500 | |
| 7 | OC | $70,000 | $60,000 | $100,000 | $110,000 | $160,000 | $150,000 | $150,000 | $125,000 | $114,500 | $125,000 | $160,000 | $160,000 | $1,484,500 | |
| 8 | Total Revenue | $1,015,000 | $955,000 | $1,195,000 | $1,255,000 | $1,555,000 | $1,495,000 | $1,495,000 | $1,345,000 | $1,282,000 | $1,345,000 | $1,405,000 | $1,555,000 | $15,897,000 | |
| 9 | | | | | | | | | | | | | | | |
| 10 | | | | | | | | | | | | | | | |
| 11 | | | | | | | | | | | | | | | |

FIG. 2B

|   | A | B | C | D | E | F |
|---|---|---|---|---|---|---|
| 1 | ID | Name | DepID | StartDate | Salary | |
| 2 | 10971 | Mary Smith | 101 | 3/1/2015 | $30,000 | |
| 3 | 11072 | John Stone | 103 | 12/20/2016 | $28,000 | |
| 4 | 10073 | Ted Chen | 115 | 5/1/2012 | $36,000 | |
| 5 | 10074 | Evan Adam | 109 | 5/1/2012 | $36,500 | |
| 6 | 10075 | Pat Lane | 101 | 6/1/2012 | $39,500 | |
| 7 | | | | | | |
| 8 | | | | | | |

FIG. 4A

|   | A | B | C | D | E | F | G |
|---|---|---|---|---|---|---|---|
| 1 | Name | DOB | No | Street | City | State | |
| 2 | John Doe | 10/31/1990 | 178 | November | San Jose | CA | |
| 3 | Mary Smith | 5/20/1995 | 261 | Bailey | San Jose | CA | |
| 4 | Ted Chan | 3/2/2000 | 10733 | DeAnza | Cupertino | CA | |
| 5 | June Stone | 5/8/1986 | 440 | Saratogo | Saratogo | CA | |
| 6 | Evan Adam | 4/3/1975 | 95 | Castro | Mountain View | CA | |
| 7 | | | | | | | |

FIG. 4B

| | A | B | C | D | E | F | G | H | I | J | K |
|---|---|---|---|---|---|---|---|---|---|---|---|
| 1 | ID | Name | DepID | StartDate | Salary | DOB | No | Street | City | State | |
| 2 | 10971 | Mary Smith | 101 | 3/1/2015 | $30,000 | 5/20/1995 | 261 | Bailey | San Jose | CA | |
| 3 | 11072 | John Stone | 103 | 12/20/2016 | $28,000 | #N/A | #N/A | #N/A | #N/A | #N/A | |
| 4 | 10073 | Ted Chen | 115 | 5/1/2012 | $36,000 | 3/2/2000 | 10733 | DeAnza | Cupertino | CA | |
| 5 | 10074 | Evan Adam | 109 | 5/1/2012 | $36,500 | 4/3/1975 | 95 | Castro | Mountain View | CA | |
| 6 | 10075 | Pat Lane | 101 | 6/1/2012 | $39,500 | #N/A | #N/A | #N/A | #N/A | #N/A | |
| 7 | | | | | | | | | | | |

FIG. 4C

MINING DATA TRANSFORMATION FLOWS IN SPREADSHEETS

BACKGROUND

In an 'Extract, Transform, Load' (ETL) methodology, data is extracted from data source(s), transformed for storage in a proper structure or format, and stored ("loaded") into a target for later access. ETL processes are implemented by systems/programs typically referred to as ETL tools, an example of which is the IBM Infosphere® Information Server offered by International Business Machines Corporation, Armonk, N.Y., U.S.A. (of which INFOSPHERE is a registered trademark). An ETL tool is an example type of data integration or data refinement tool, and an ETL process performed by an ETL tool is an example process for data integration/refinement.

Traditional ETL tools were designed primarily for data engineers with a solid technical background. They may provide a rich user interface client along with proprietary server-centric data processing. In cloud or hybrid environments, data movement is becoming increasingly more common, but this can pose problems for unsophisticated users.

SUMMARY

Shortcomings of the prior art are overcome and additional advantages are provided through the provision of a computer-implemented method. The method identifies operations defined in a spreadsheet. The method also identifies source data, in the spreadsheet, on which the operations operate. The method automatically creates an extract, transform, load (ETL) data transformation flow. This creating selects, in the ETL system, source data endpoint(s) for data extraction. The source data endpoint(s) include the identified source data. The creating also selects target data endpoint(s) for data loading. The creating maps at least one of the identified operations to ETL operation(s) for data transformation. The creating also builds the ETL data transformation flow. The ETL data transformation flow defines extraction from the selected source data endpoint(s), transformation based on the ETL operation(s), and loading to the selected target data endpoint(s). Based on creating the ETL data transformation flow, the method executes the created ETL data transformation flow. The executing performs the extraction from the selected source data endpoint(s), transformation based on the ETL operation(s), and loading to the selected target data endpoint(s).

Further, a computer system is provided that includes a memory and a processor in communication with the memory, wherein the computer system is configured to perform a method. The method identifies operations defined in a spreadsheet. The method also identifies source data, in the spreadsheet, on which the operations operate. The method automatically creates an extract, transform, load (ETL) data transformation flow. This creating selects, in the ETL system, source data endpoint(s) for data extraction. The source data endpoint(s) include the identified source data. The creating also selects target data endpoint(s) for data loading. The creating maps at least one of the identified operations to ETL operation(s) for data transformation. The creating also builds the ETL data transformation flow. The ETL data transformation flow defines extraction from the selected source data endpoint(s), transformation based on the ETL operation(s), and loading to the selected target data endpoint(s). Based on creating the ETL data transformation flow, the method executes the created ETL data transformation flow. The executing performs the extraction from the selected source data endpoint(s), transformation based on the ETL operation(s), and loading to the selected target data endpoint(s).

Yet further, a computer program product including a computer readable storage medium readable by a processing circuit and storing instructions for execution by the processing circuit is provided for performing a method. The method identifies operations defined in a spreadsheet. The method also identifies source data, in the spreadsheet, on which the operations operate. The method automatically creates an extract, transform, load (ETL) data transformation flow. This creating selects, in the ETL system, source data endpoint(s) for data extraction. The source data endpoint(s) include the identified source data. The creating also selects target data endpoint(s) for data loading. The creating maps at least one of the identified operations to ETL operation(s) for data transformation. The creating also builds the ETL data transformation flow. The ETL data transformation flow defines extraction from the selected source data endpoint(s), transformation based on the ETL operation(s), and loading to the selected target data endpoint(s). Based on creating the ETL data transformation flow, the method executes the created ETL data transformation flow. The executing performs the extraction from the selected source data endpoint(s), transformation based on the ETL operation(s), and loading to the selected target data endpoint(s).

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B depict an example data source from which data transformation flows are mined in accordance with aspects described herein;

FIGS. 4A-4C depict an example in which data sources are mined for an outer join data transformation flow, in accordance with aspects described herein;

DETAILED DESCRIPTION

Described herein are approaches for mining data transformation flows from data sources, such as spreadsheets. As described above, data transformation is becoming more common. Relatively unsophisticated users who do not necessarily have a solid technical background may nonetheless be expected to handle data transformation, for instance data consolidation, filtering, refinement, and/or movement. A commonly-used and relatively simple data processing tool for business users is a spreadsheet application. Data samples can be easily entered or imported into spreadsheets, and data processing functions implemented through the definition and execution of formulas can be directly invoked to transform spreadsheet data into desired results. This may work well when the volume of data is relatively small and fits into a spreadsheet of a practical size, but can be problematic with larger data sets.

An ETL process, which is an example transformation process, nominally includes three overarching steps: (i) Extract—select/extract data from the data source(s) and/or data set(s); (i) Transform—integrate data of the data sets/sources, apply controls to the data, transform the data, etc.; and (iii) Load—load the result of the transformation(s) to a target.

Figure 1:
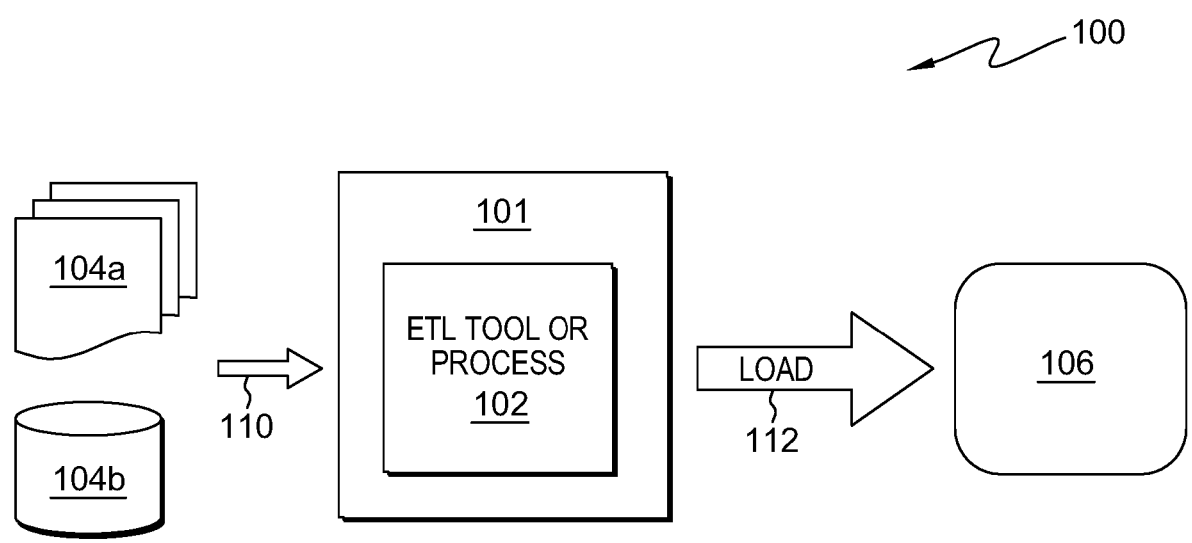
FIG. 1 depicts an example environment to incorporate and use aspects described herein.

FIG. 1 depicts an example environment to incorporate and use aspects described herein. Data integration or transformation tool/process (e.g. ETL tool/process) 102, which is implemented by one or more computer systems 101 and/or software executing thereon, extracts data from data sets/sources 104a, 104b. Example data sources include relational databases (DB2, SQL, etc.), comma separated value (CSV) files, and COBOL programs, among others. Example data sets include third-party data from a third-party system, data from sensor(s), and log files, among others.

If the ETL tool/process 102 and/or target accepts a given data element, that data is loaded to the target—in this example system 106, which may be a database or a computer system managing or hosting the database, for instance. Communication 110 and 112, shown as arrows extending between components of FIG. 1, may occur over any appropriate wireless or wired communication link(s) for communicating data, which communication link(s) can encompass one or more local area network(s) and/or wide area network(s). Thus, in some embodiments, components form and/or communicate via one or more intervening networks over wired and/or wireless communications links.

Approaches described herein mine data transformation flows from spreadsheets, which transformation flows can then be applied to and executed by transformation systems, such as an ETL system of FIG. 1. Data samples can be easily entered or imported into spreadsheets executing on a user computer system, and data processing functions (formulas) can be directly invoked to transform the collected data into the desired results. A data transformation flow is defined in this process, from data collection, applying data processing functions, and obtaining the result.

'Spreadsheet' and 'worksheet' are used interchangeably herein, though sometimes a 'spreadsheet' refers specifically to a file that houses one or more worksheets. Formulas can be applied to data cells on different and/or multiple worksheets. More complicated data transformation flows can be easily defined in this process without the use of an ETL authoring tool. Hence, business users can quickly edit formulas, change the way they are applied, or move/rearrange data cells, as examples, all without additional technical background or knowledge about an ETL engine. Data samples in the worksheets are normally small and limited due to practical reasons. However, it is appealing if the implicitly-defined data transformation flow(s) defined in the spreadsheet and applying to the data of the spreadsheet, which may be a small portion of a larger dataset, could be leveraged and apply to the larger set of data in ETL source(s), with the results loaded to an ETL target. A manual process could recreate the implicitly-defined flow on an ETL authoring tool, however this manual process could be error prone and time consuming, and may require that the authoring users possess a solid technical background.

Aspects described herein present approaches for automatically mining data flows defined in spreadsheets, and automatically creating them in a data transformation/refinement environment, such as the IBM Data Refinery environment/tool offered by International Business Machines Corporation, Armonk, N.Y., U.S.A.

Data transformation flow mining approaches examine formula cells in the spreadsheet and identify valid formulas that can be mapped to transformation function(s) in a target engine, for instance IBM Data Refinery. Data source(s) and target(s) in such data transformation flows can be re-bound to desired data sources, e.g. in IBM Data Refinery. Although IBM Data Refinery is used in examples described herein, the described approaches can be applied to other ETL engines, or more generally other data transformation tools. The approaches can greatly reduce time and resources spent to recreate data transformation flows defined in the spreadsheets, and avoid errors prevalent in manual processes to accomplish the same task.

An example mining model includes the following components that are described in detail herein: Mining transformation operations; Function mappings; Source and target bindings; and creation and saving data transformation flow (s).

Mining transformation operations—FIGS. 2A-2B depict an example data source from which data transformation flows are mined in accordance with aspects described herein. The data source is a spreadsheet in these examples.

Referring initially to FIG. 2A, column A specifies six regions (NA, LA, AF, EU, AS and OC). Row 1 specifies twelve months of the year. The data points—dollar figures in range B2:M7—are entered for each region across each of the twelve months.

Formulas in spreadsheets can be entered into any individual cells. Evaluation of a formula in a cell produces the value for that cell. For business operation datasets, it is common for an equivalent formula to be used in every active cell in a given column (or row), the evaluation of which is based on data from those column(s) (or row(s)). For example, in FIG. 2A the sales data ("allSalesData") is presented in columns B through M corresponding to the sales in January to December for a particular year, and each row (2 through 7) represents total monthly sales revenue in the particular geographical region for that row. Referring to FIG. 2B, a new active column N, with a heading "Annual Revenue" (see cell N1) designating 'aggregatedSalesData' is added to sum the annual sales for each of the 6 regions. Summation formulas are therefore added in cells N2 to N7. For instance, the formula "sum(B2:M2)" is added in cell N2, formula "sum(B3:M3)" is added in cell N3, and so on. Each such formula operates to sum the monthly sales figures for the region, to produce the annual revenue for that region.

Additionally in FIG. 2B, row 8 is made active in that it includes monthly sales revenue for each month. Heading "Total Revenue" is placed in cell A8, formula "sum(B2:B7)" in added to cell B8, formula "sum(C2:C7)" is added to cell C8, and so on. Meanwhile, a total annual revenue across all sites is added by way of a formula in cell N8. The formula could be either "sum(B8:M8)" or "sum(N2:N7)", as they each produce the same, correct total annual revenue figure.

The definition and insertion of the formulas into the spreadsheet of FIGS. 2A and 2B may be done by a user. A data transformation flow can be rendered from that. This example can be recast into the following two separate data transformation operations:

-(i) allSalesData -> (add new column) annualRevenuePerRegion = (Jan + Feb + ... + December); and
-allSalesData -> (add new column) annualRevenuePerRegion = (Jan + Feb + ... + December) -> select(SUM(Jan), SUM(Feb),...,SUM(December), SUM(annualRevenuePerRegion))

An implicit data transformation flow defined by the spreadsheet can be represented as a union of (i) and (ii) above:

-[Flow 1] allSalesData -> (add new column) annualRevenuePerRegion = (Jan + Feb + ... + December) union allSalesData -> (add new column) annualRevenuePerRegion = (Jan + Feb + ... + December) -> select(SUM(Jan), SUM(Feb),...,SUM(December), SUM(annualRevenuePerRegion))

In this example, the mining model can assume that data in the entire spreadsheet is identified as the dataset that would be stored in a target data store (e.g. once the target is bound to a particular data store in IBM Data Refinery). The mining model can enable multiple target dataset selections, if desired. When the target gets rebound in IBM Data Refinery, the user can choose to select parts of the flow, for instance just the second part, as the target, e.g.: allSalesData→(add new column) annualRevenuePerRegion=(January+February+ . . . +December)→select(SUM(January), SUM(February), . . . , SUM(December), SUM(annualRevenuePerRegion)).

In this case, no union operation is required and the first part of the flow would not appear in the bound data flow created in accordance with aspects described herein. Accordingly, a user can select from the identified different transformation operations from the spreadsheet and indicate which transformations are to be automatically converted into a transformation flow for use with, e.g., an ETL program. In this particular example, the second transformation takes the first transformation a step further.

Operation Column, Operation Rows, and Operation Cells—Column N (Annual Revenue, per region) is referred to as an "operation column". The formulas in active cells of column N are "equivalent", in that they differ only in the cell positions referenced in the formulas relative to positions of the cells where these formulas reside. The formula in cell N2 is "sum(B2:M2)" and the formula in cell N7 is "sum(B7:M7)". Had formula N2 referenced an additional cell, say C2 ("sum(B2:M2)+C2"), then the corresponding formula of cell N7 would therefore be "sum(B7:M7)+C7". An 'out-of-bound' situation may arise if a formula references a cell in a different row than the one in which the formula appears. For example, if cell N2 instead contained formula "sum(B2:M2)+C5", with C5 being the out-of-bound cell, then the equivalent formula for cell N7 would be "sum(B7:M7)+C10", to maintain the same relative distance between the out-of-bound cells C5 and C10 as exists between formula cells N2 and N7. However, in this example, cell C10 falls in an empty row.

Therefore, in some examples, each equivalent formula in an operation column may reference only cells in the same row as the formula cell (e.g. any formula in column N is to reference only cells from the same row in which the formula appears).

Similarly, row 8 (Total Revenue, per month) may be considered an "operation row". The formulas in active cells of row 8 (i.e. the formulas in cells B8:M8) may be equivalent if any formula in row 8 references only cells in the same column as the formula cell.

Individual formula cells that are not part of an operation row or operation column can also be used in an ETL pipeline, and are referred to as "operation cells".

Base Data Transformation Flow—Once a data flow is identified by the flow mining approach, a base data transformation flow can be automatically created. A base data transformation flow can contain one more pipelines, each being associated with a respective target endpoint and one or more source endpoints. These source/target endpoints in the base flow can be bound or rebound to specific data stores, such as database tables or other non-database files. A base data transformation flow can become "bound" once all the source/target endpoints are bound to respective data stores. A data transformation flow that can be executed/run in, e.g., IBM Data Refinery is a bound base transformation flow.

Function Mappings—Spreadsheet functions can be automatically mapped to ETL (e.g. IBM Data Refinery) transformation operations. For example, a common spreadsheet function "UPPER" can be mapped to the operation "uppercase". At the time the data transformation flow is created, each function can be converted to its corresponding function. ETL functions can be implemented by R functions, as one example. R is a programming language commonly used for statistical data processing. Spreadsheet functions, like a sum operation, can be mapped to R programming language functions, implemented using verbs. For example, adding the new column ARPR (Annual Revenue Per Region) as shown in the figures can be mapped to the R function mutate(<input>, ARPR=January+February+ . . . +December). Aggregate functions, such as SUM, MAX, MIN, and AVERAGE in operations can be mapped to their counterparts in R dplyr functions (sum, max, min, and mean). "dplyr" is a package installed on top of the R programming language that provides additional verbs to extend the base R programming language capabilities.

Source and Target Bindings—Before a data transformation flow can be created, a spreadsheet (or other data source being mined) is analyzed. This analysis can involve identifying operation columns, operation rows, and/or operation cells in all pages ("sheet" or "worksheets") of the spreadsheet. For spreadsheets that contain only one page with the operation columns, operation rows or operation cells, the analysis can be performed rather straightforwardly. However, a formula on one page may reference cells on another page. If multiple pages in a spreadsheet contain valid operation columns, rows, or cells, multiple datasets may be available for target dataset(s) selection. This translates to selection of pipelines, described as follows.

The example of FIGS. 2A and 2B contains all of the source data (B2:M7) in that example. Many times, the source data in the spreadsheet may only represent a subset of the full dataset of source data. The full dataset may reside in a permanent data store, such as database table(s) for instance. Moreover, multiple worksheets may contain multiple source datasets, each of which could be bound to respective source data store(s). Similarly, result may need to be written to one or more target data stores. Additionally, if there are multiple selections of the result datasets in the worksheets, one or more may need to be selected as the target dataset(s) which will be saved to the target data store(s). Once a data flow is identified by the flow mining approach described herein, an (unbound) data transformation flow can be automatically created. A data transformation flow can contain one more pipelines, each being associated with one target endpoint and one or more source endpoints. These source/target endpoints in the base flow can be bound or rebound to specific data stores, such as database tables or other non-database files. The source/target binding process can contain a first (e.g. optional) binding step and a second (e.g. mandatory, in some examples) binding step. The first binding step may be available only if there are multiple pipelines. In such a case, a default pipeline may be selected if the selection step is skipped. The second binding step can involve choosing a data store connection and a specific dataset path/id in the data store for each source and target endpoint in the selected pipeline(s). However, in some cases there may be a special target that contains 'dummy' connection properties. In this case, the result data may not necessarily be written to any ETL data store/database, but instead be written to an arbitrary target, such as a console/user interface, for instance an administrator console/GUI for the ETL tool, e.g. of a computer system affiliated with the ETL tool.

Creating and Saving Data Transformation Flows—Once pipelines are selected and source/target endpoints are bound, a data transformation flow may be completely defined and ready for execution. It can be saved to a metadata store and executed in the future. Definitions of the selected pipeline(s), and optionally additional (non-selected) identified pipelines if desired, could be saved in the metadata store in some recognizable format/code. Such format could be one that a system, such as an ETL system, could recognize. Additionally or alternatively, the format could be a format, such as the JSON format, which could be converted on demand into an appropriate execution structure that the ETL system can run. This enables portability, customization, and reuse of pipelines, if desired. For instance, it enables rebinding to different data stores, for reuse.

Further aspects are described again referring to the example of FIGS. 2A-2B. The source data (e.g. the revenue data) may be manually created/entered into the spreadsheet along with appropriate header names, formatting, etc. Once the source data is created and entered, the "Annual Revenue" column (N) is added, and a formula "SUM(B2:M2)" is added for the NA region (i.e. in row 2, the formula is entered in cell N2). The formula in cell N2 can then be copied for each region in the column. This can be done using a common drag operation to propagate the formula down into cells N3-N7. This causes equivalent formulas (SUM (B3:M3); SUM(B4:M4), etc.) to be propagated into cells N3-N7.

As a next user-provided transformation, row 8 for "Total Revenue" is added with the formula "SUM(B2:B7)" being placed in cell B8. This formula is propagated into cells C8:M8). The result is shown in FIG. 2B. Finally, a formula of either "sum(B8:M8)" or "sum(N2:N7)" is entered into cell N8. The result is shown as FIG. 2B.

After these, the desired operations have been completed, and flow mining is invoked to import and analyze the spreadsheet. In one example, the spreadsheet file is saved and input to a program to perform the flow mining. In another example, the flow mining processing is incorporated into the spreadsheet program, for instance as a plug-in or add-on.

Figure 3:
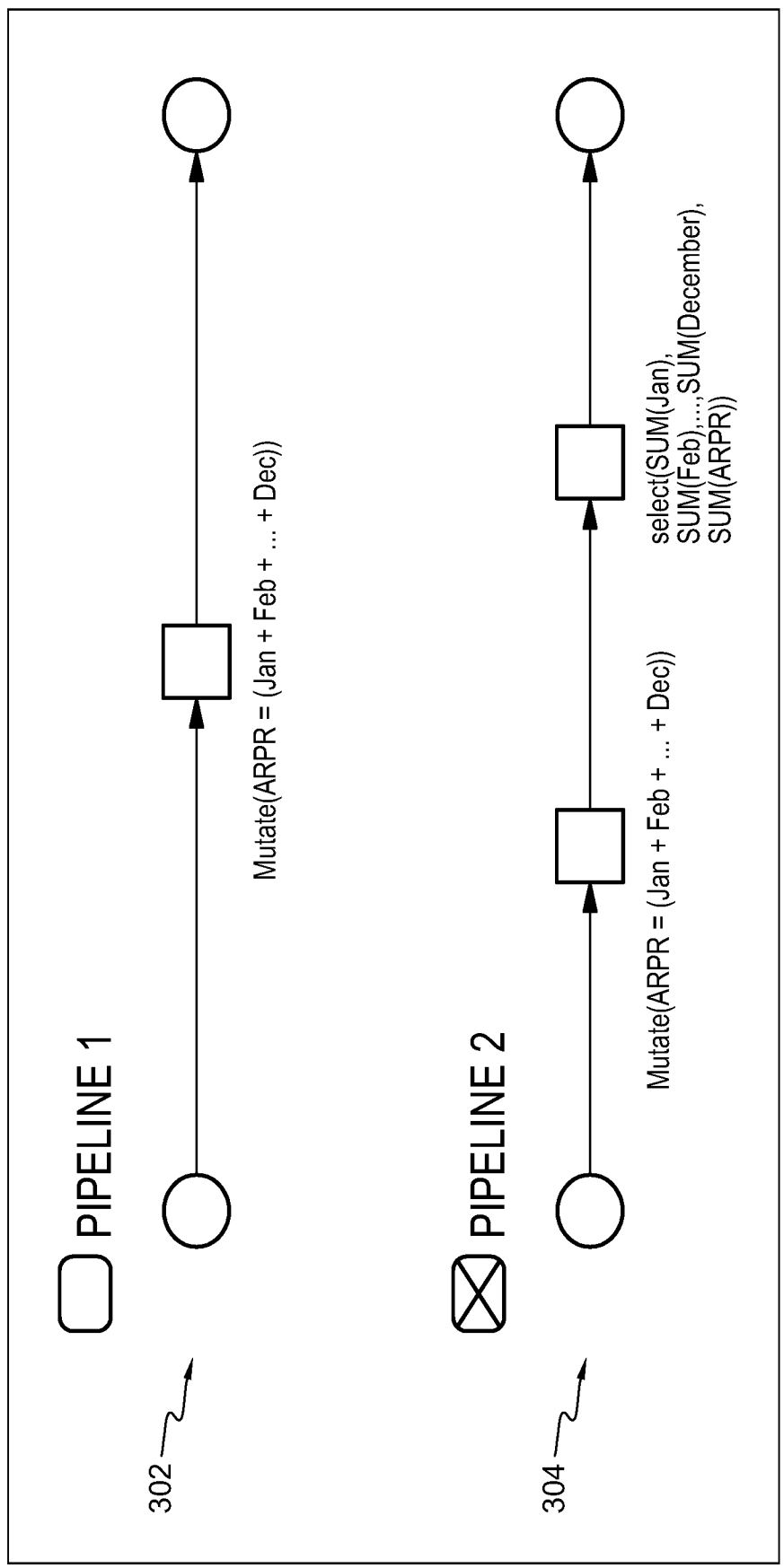
FIG. 3 depicts example ETL pipelines of the data transformation flows mined from the data source of FIGS. 2A-2B, in accordance with aspects described herein.

The particular data transformation operations are presented above as (i) and (ii), corresponding to two pipelines shown in FIG. 3, depicting example ETL pipelines of the data transformation flows mined from the data source of FIGS. 2A-2B. The operation (i), (add new column) annualRevenuePerRegion=(January+February+ . . . +December) is presented as pipeline 302, mapped to the R dplyr function "mutate". The operation (ii), which is operation (i) with select(SUM(January), SUM(February), . . . , SUM(December), SUM(annualRevenuePerRegion)) added, is presented as pipeline 304, mapped to the "mutate" and "select" dplyr functions. In the source/target binding process, the user selects the second pipeline and binds the source/target endpoints in this pipeline with, e.g., a source database table and a target .csv (comma separated value) file on IBM Cloud Object Storage System™, offered by International Business Machines Corporation, Armonk, N.Y., U.S.A. (of which CLOUD OBJECT STORAGE SYSTEM is a trademark). By way of specific example, the source bind information could include, as properties for the connection: Type=DB2; Database=myDB; Host=myHost; Port=50000; Username=user; Password=pwd; table_name=myTable; and schema_name=mySchema. The target bind information could include, as properties for the connection: Type=CloudStorageObject; Bucket=myBucket; file_name=myFile.csv; file_format=csv; access_key=myAccessKey; secret_key=mySecretKey; and URL=https://my.url.ibm.com.

The transformation flow was created and the source/target endpoints bound, at which point the flow can be saved and run as a "job". The job execution status can be monitored periodically in, e.g., IBM Data Refinery.

FIGS. 4A-4C depict an example in which data sources are mined for an outer join data transformation flow, in accordance with aspects described herein. This example simulates a SQL outer join. FIG. 4A presents an Employee worksheet containing information (employee ID, name, department id, job start date, and the employee's current salary) about employees of a company. FIG. 4B presents a Person worksheet showing individuals living in California. FIG. 4C is a sheet showing data from FIGS. 4A and 4B joined for common entities. In FIG. 4C, columns A through E contain references to cells in the employee worksheet of FIG. 4A, and columns F through J are formula cells that use a VLOOKUP( ) function to simulate the join condition (Employee.Name=Person.Name). For example, the formula "VLOOKUP($B$2,Person!$A$1:$F$6,2,FALSE)" (in cell F2) is searching for the Name in cell B2 ("Mary Smith") in the Person worksheet in the region identified by cell A1 to F6. If there is a match, the cell value in column B (the 2nd column of that range, i.e. the DOB column) will become the result of the formula, and therefore, the value of cell F2. Similarly, all other active cells in columns F to J contain similar VLOOKUP( ) formulae. When there is no matched name in the Person worksheet, a #N/A symbol will be displayed as the cell value, per behavior of the spreadsheet program.

Figure 5:
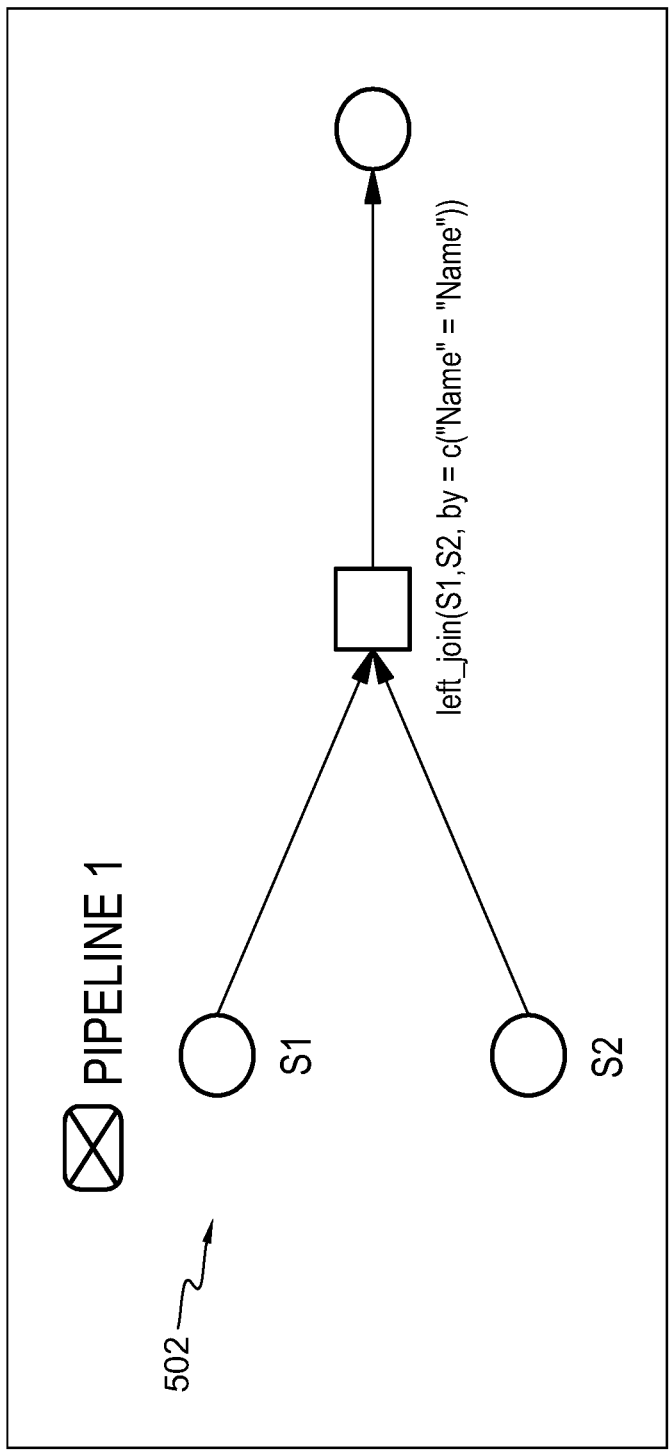
FIG. 5 depicts an example ETL pipeline of the data transformation flow mined from the data sources of FIGS. 4A-4B, in accordance with aspects described herein.

The flow mining tool can identify column operations with these VLOOKUP functions as join operations. FIG. 5 depicts the ETL pipeline 502 of the data transformation flow mined from the data sources of FIGS. 4A-4C (particularly FIG. 4C), in accordance with aspects described herein. The two source end-points in this pipeline are identified by "S1" and "S2". The left join operation simulated by the VLOOKUP( ) formulae is mapped to the R dplyr function left_join(S1,S2, by=c("Name"="Name"))'. S1 and S2 can be bound to, e.g., two separate DASHDB database tables, while the target could be bound to a .csv file on IBM Cloud Object Storage System™. By way of specific example:

The source bind information for source S1 could include, as properties for the connection: Type=DASHDB; Database=myDB; Host=myHost; Port=50001; Username=user; Password=pwd; table_name=myTable1; and schema_name=mySchema1;

The source bind information for source S2 could include, as properties for the connection: Type=DASHDB; Database=myDB; Host=myHost; Port=50001; Username=user; Password=pwd; table_name=myTable2; and schema_name=mySchema2; and The target bind information could include, as properties for the connection: Type=CloudStorageObject; Bucket=myBucket1; file_name=myFile1.csv; file_format=csv; access_key=myAccessKey; secret_key=mySecretKey; and URL=https://my.url.ibm.com.

Figure 6:
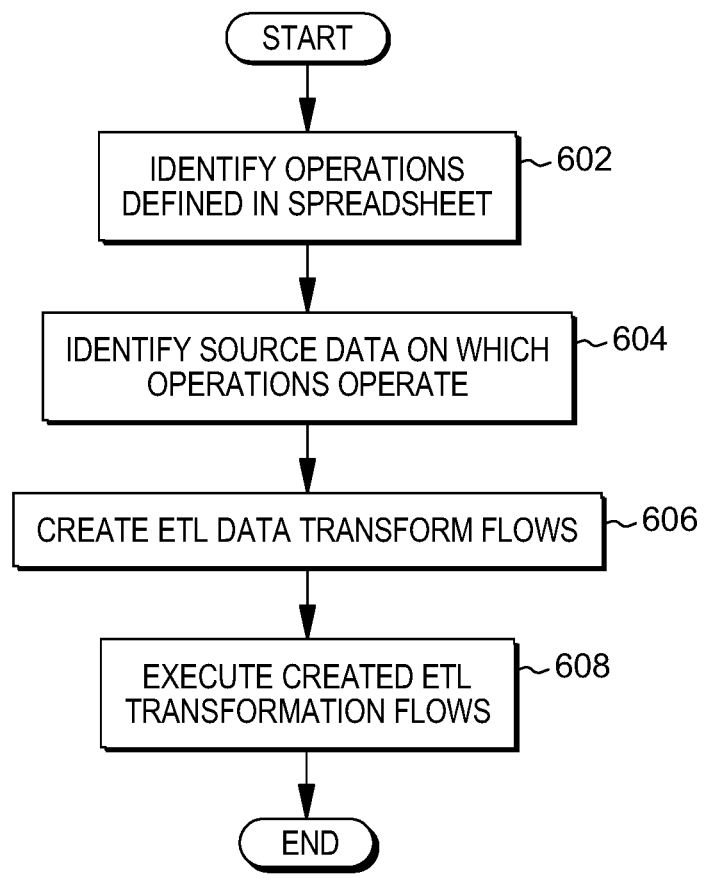
FIG. 6 depicts an example process for mining data transformation flows from a spreadsheet, in accordance with aspects described herein.

Thus, FIG. 6 depicts an example process for mining data transformation flows from a spreadsheet, in accordance with aspects described herein. In some examples, the process is performed by one or more computer systems, such as those described herein, which may include one or more computer systems of or in communication with an ETL system, one or more cloud computer systems, and/or one or more other computer systems.

The process begins by identifying (602) operations defined in a spreadsheet. The identified operations can include (i) operations of a spreadsheet column that includes cells with a common formula using different cell references (e.g. operation column), (ii) operations of a spreadsheet row that includes cells with a common formula using different cell references (e.g. operation row), and/or (iii) operations of individual cells that do not include a formula common to other cells of the spreadsheet (operation cell), as examples.

The process then identifies (604) source data, in the spreadsheet, on which the operations operate. The source data can include data in cells of the spreadsheet that are non-formula cells. The process automatically creates (606) an extract, transform, load (ETL) data transformation flow. In particular, as one embodiment, this creating includes selecting, in the ETL system, one or more source data endpoints for data extraction, the one or more source data endpoints including the identified source data; selecting one or more target data endpoints for data loading; mapping at least one of the identified operations to one or more ETL operations for data transformation; and building the ETL data transformation flow, where the ETL data transformation flow defines extraction from the selected one or more source data endpoints, transformation based on the one or more ETL operations, and loading to the selected one or more target data endpoints. This building the ETL transformation flow can include building the code for the selected pipeline (s) that the user selected.

The selected one or more target data endpoints could include at least one target data endpoint (such as a database) in the ETL system. Additionally or alternatively, at least one of the selected one or more target data endpoints could include a graphical user interface to which data loads of the created ETL data transformation flow are directed. This may be useful in testing environments and/or when a user desires to see a graphical representation of the loads in real-time, for instance.

Returning to the process of FIG. 6, the process proceeds by executing (608) the created ETL data transformation flow. The executing can perform the extraction from the selected one or more source data endpoints, transformation based on the one or more ETL operations, and loading to the selected one or more target data endpoints, as defined by the flow.

In a specific example of the creating (606), the process builds a plurality of transformation pipelines from the identified operations, with each transformation pipeline of the plurality being associated with an operation of the identified operations, a respective target endpoint, and a respective at least one source data endpoint. The process can present the built plurality of transformation pipelines to a user, and receive a selection from the user of at least one of those built transformation pipelines. The at least one identified operation for the mapping to the one or more ETL operations can be the at least one identified operation from which the at least one built transformation pipeline is built. These built plurality of transformation pipelines can be stored as metadata, and the building the ETL data transformation flow can include retrieving from storage the selected at least one built transformation pipeline and converting that to an execution format that is recognized by the ETL system.

Although various examples are provided, variations are possible without departing from a spirit of the claimed aspects.

Figure 7:
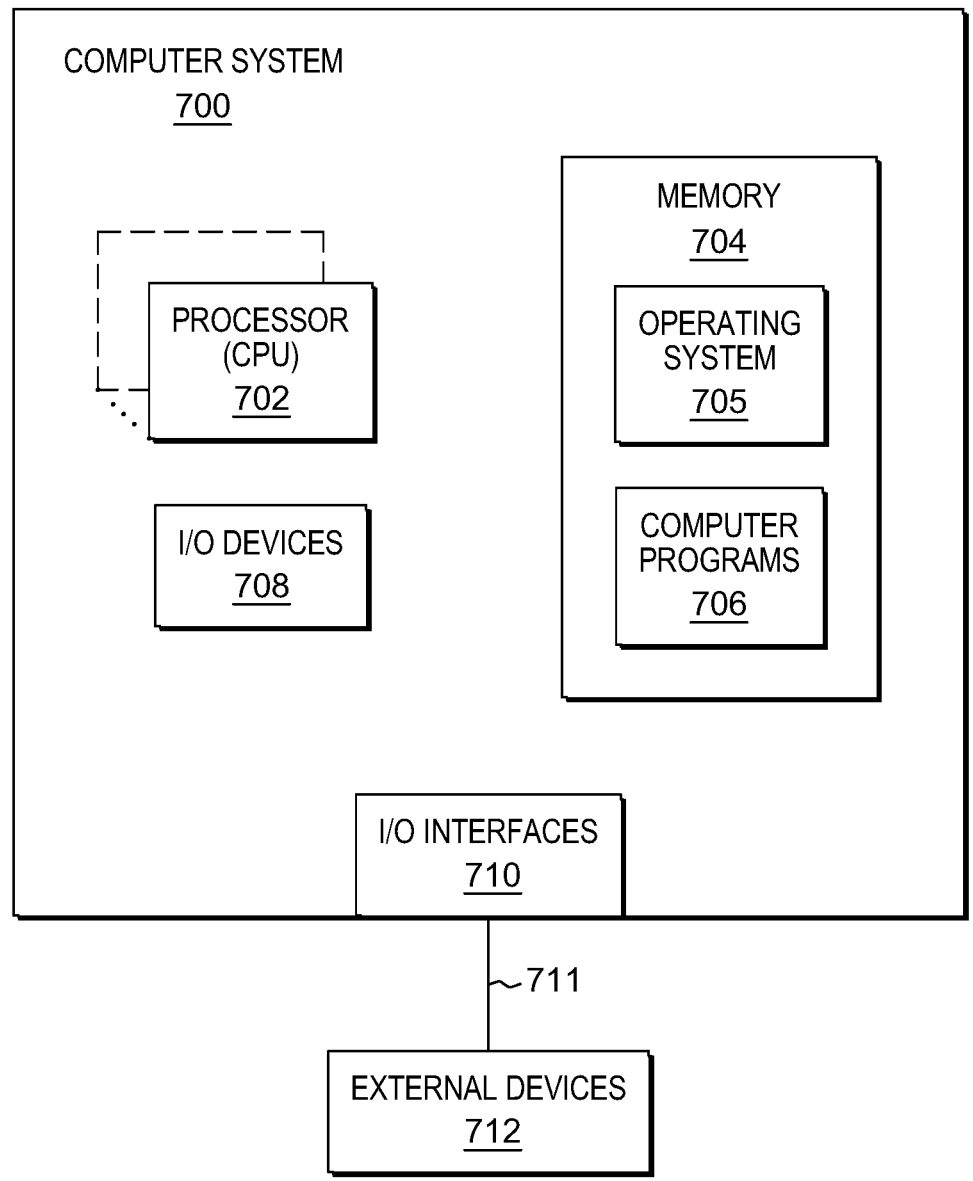
FIG. 7 depicts one example of a computer system and associated devices to incorporate and/or use aspects described herein.

Processes described herein may be performed singly or collectively by one or more computer systems, such as one or more ETL systems, client computing devices in communication with the ETL system, and/or any other computer system as desired. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive (s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
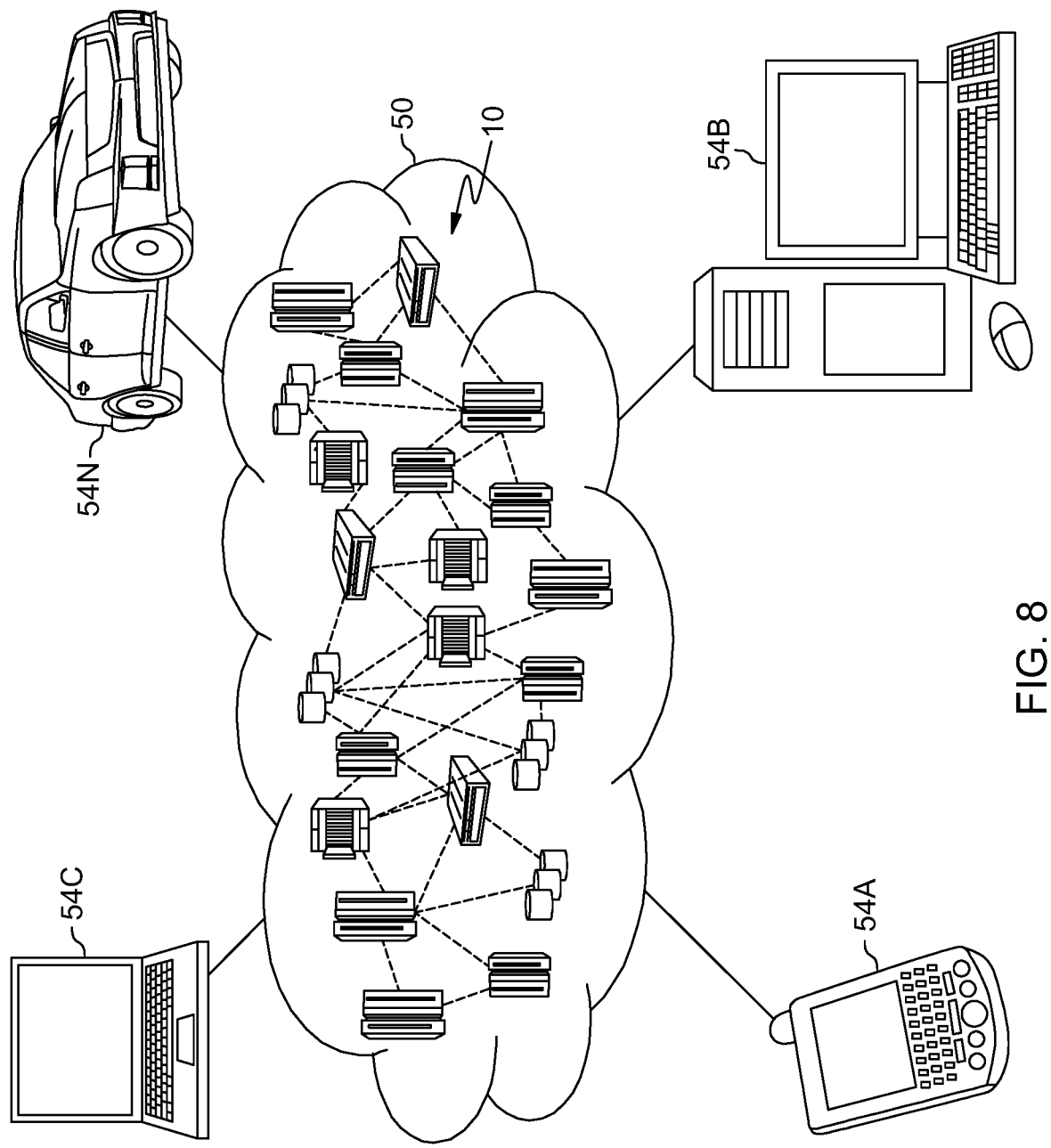
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
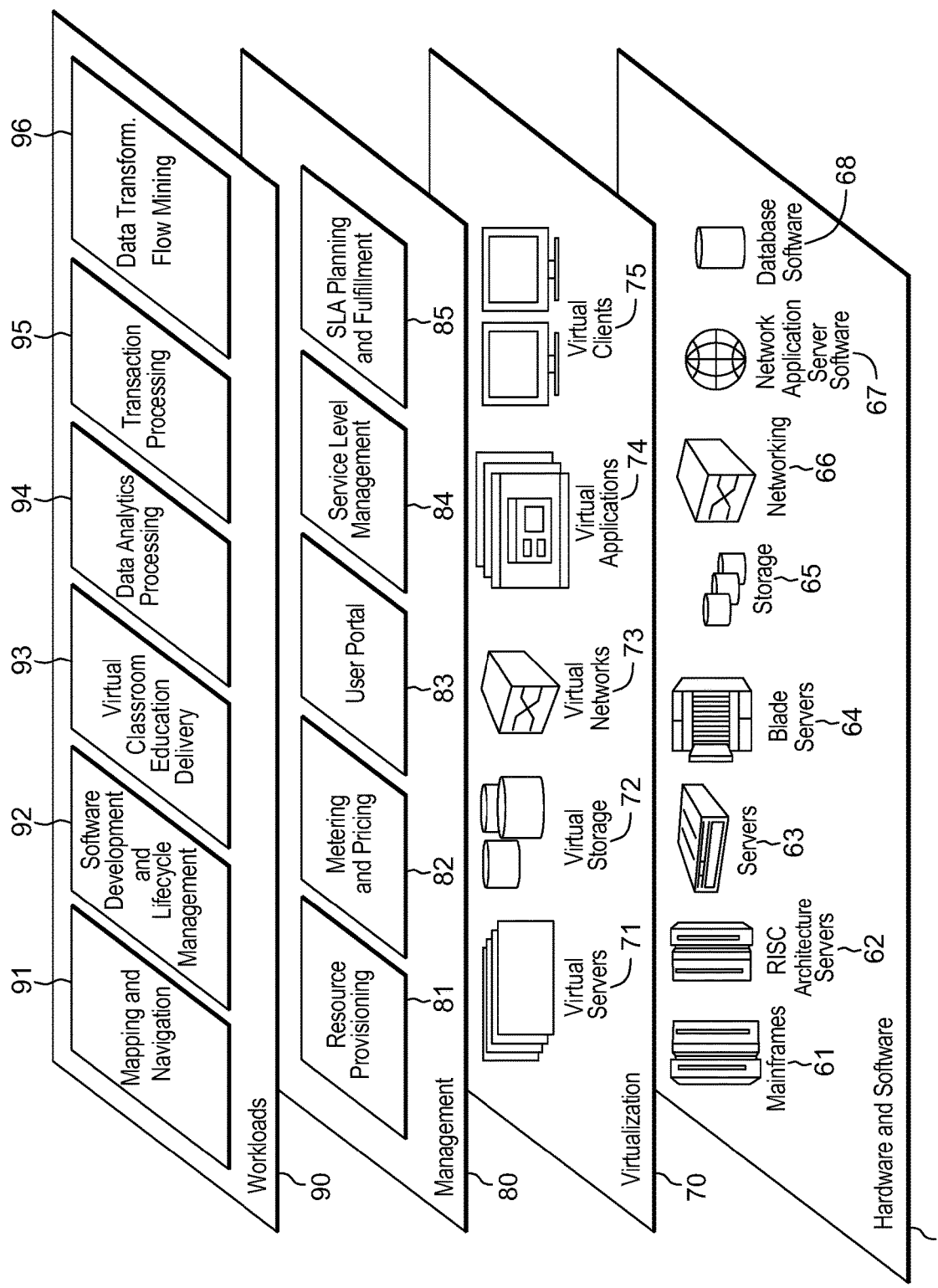
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transformation flow mining 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining a spreadsheet comprising operations defined in the spreadsheet and source data, in the spreadsheet, on which the operations operate, the operations defining one or more data transformations implemented through definition of formulas of the spreadsheet and execution of the formulas in a spreadsheet application environment to transform the source data thereof into results in the spreadsheet application environment;
automatically creating, based on (i) identifying the operations and (ii) the source data in the spreadsheet, an extract, transform, load (ETL) data transformation flow in an ELT environment, the ETL environment being a different environment than the spreadsheet execution environment, the creating comprising:
selecting, in an ETL system, one or more source data endpoints for data extraction, the one or more source data endpoints including at least some data other than the source data;
selecting one or more target data endpoints for data loading;
mapping at least one of the identified operations defined in the spreadsheet, the at least one of the identified operations comprising at least one spreadsheet function of the spreadsheet application environment, to one or more ETL operations of the ETL system for data transformation, the one or more ETL environment; and
building the ETL data transformation flow, the ETL data transformation flow defining extraction from the selected one or more source data endpoints, transformation based on the one or more ETL operations, and loading to the selected one or more target data endpoints; and
executing the created ETL data transformation flow, the executing performing the extraction from the selected one or more source data endpoints, including extraction of the at least some data other than the source data, transformation based on the one or more ETL operations, including transformation of the at least some data other than the source data, and loading to the selected one or more target data endpoints.

2. The method of claim 1, wherein the identified operations comprise at least one selected from the group consisting of: (i) operations of a spreadsheet column that includes cells with a common formula using different cell references, (ii) operations of a spreadsheet row that includes cells with a common formula using different cell references, and (iii) operations of individual cells that do not include a formula common to other cells of the spreadsheet.

3. The method of claim 1, wherein the source data comprises data in cells of the spreadsheet that are non-formula cells.

4. The method of claim 1, wherein the automatically creating comprises:
building a plurality of transformation pipelines from the identified operations, each transformation pipeline of the plurality of transformation pipelines being associated with an operation of the identified operations, a respective target endpoint, and a respective at least one source data endpoint;
presenting the built plurality of transformation pipelines to a user; and
receiving a selection from the user of at least one built transformation pipeline of the built plurality of transformation pipelines, wherein the at least one identified operation for the mapping to the one or more ETL operations is the at least one identified operation from which the at least one built transformation pipeline is built.

5. The method of claim 4, further comprising storing the built plurality of transformation pipelines as metadata, and wherein the building the ETL data transformation flow comprises retrieving from storage the at least one built transformation pipeline, and converting the at least one built transformation pipeline to an execution format recognized by the ETL system.

6. The method of claim 1, wherein the selected one or more target data endpoints comprises at least one target data endpoint in the ETL system.

7. The method of claim 1, wherein the selected one or more target data endpoints comprises a graphical user interface to which data loads of the created ETL data transformation flow are directed.

8. A computer system comprising:
a memory; and
a processor in communication with the memory, wherein the computer system is configured to perform a method comprising:
obtaining a spreadsheet comprising operations defined in the spreadsheet and source data, in the spreadsheet, on which the operations operate, the operations defining one or more data transformations implemented through definition of formulas of the spreadsheet and execution of the formulas in a spreadsheet application environment to transform the source data thereof into results in the spreadsheet application environment;

automatically creating, based on (i) identifying the operations and (ii) the source data in the spreadsheet, an extract, transform, load (ETL) data transformation flow in an ETL environment, the ETL environment being a different environment than the spreadsheet execution environment, the creating comprising:

selecting, in an ETL system, one or more source data endpoints for data extraction, the one or more source data endpoints including at least some data other than the source data;

selecting one or more target data endpoints for data loading;

mapping at least one of the identified operations defined in the spreadsheet, the at least one of the identified operations comprising at least one spreadsheet function of the spreadsheet application environment to one or more ETL operations of the ETL system for data transformation, the one or more ETL operations of the ETL system being one or more functions of the ETL environment; and building the ETL data transformation flow, the ETL data transformation flow defining extraction from the selected one or more source data endpoints, transformation based on the one or more ETL operations, and loading to the selected one or more target data endpoints; and executing the created ETL data transformation flow, the executing performing the extraction from the selected one or more source data endpoints, including extraction of the at least some data other than the source data, transformation based on the one or more ETL operations, including transformation of the at least some data other than the source data, and loading to the selected one or more target data endpoints.

9. The computer system of claim 8, wherein the identified operations comprise at least one selected from the group consisting of: (i) operations of a spreadsheet column that includes cells with a common formula using different cell references, (ii) operations of a spreadsheet row that includes cells with a common formula using different cell references, and (iii) operations of individual cells that do not include a formula common to other cells of the spreadsheet.

10. The computer system of claim 8, wherein the source data comprises data in cells of the spreadsheet that are non-formula cells.

11. The computer system of claim 8, wherein the automatically creating comprises:

building a plurality of transformation pipelines from the identified operations, each transformation pipeline of the plurality of transformation pipelines being associated with an operation of the identified operations, a respective target endpoint, and a respective at least one source data endpoint;

presenting the built plurality of transformation pipelines to a user; and receiving a selection from the user of at least one built transformation pipeline of the built plurality of transformation pipelines, wherein the at least one identified operation for the mapping to the one or more ETL operations is the at least one identified operation from which the at least one built transformation pipeline is built.

12. The computer system of claim 11, wherein the method further comprises storing the built plurality of transformation pipelines as metadata, and wherein the building the ETL data transformation flow comprises retrieving from storage the at least one built transformation pipeline, and converting the at least one built transformation pipeline to an execution format recognized by the ETL system.

13. The computer system of claim 8, wherein the selected one or more target data endpoints comprises at least one target data endpoint in the ETL system.

14. The computer system of claim 8, wherein the selected one or more target data endpoints comprises a graphical user interface to which data loads of the created ETL data transformation flow are directed.

15. A computer program product comprising:

a computer readable storage medium readable by a processing circuit and storing instructions for execution by the processing circuit for performing a method comprising:

obtaining a spreadsheet comprising operations defined in the spreadsheet and source data, in the spreadsheet, on which the operations operate, the operations defining one or more data transformations implemented through definition of formulas of the spreadsheet and execution of the formulas in a spreadsheet application environment to transform the source data thereof into results in the spreadsheet application environment;

automatically creating, based on (i) identifying the operations and (ii) the source data in the spreadsheet, an extract, transform, load (ETL) data transformation flow in an ETL environment, the ETL environment being a different environment than the spreadsheet execution environment, the creating comprising:

selecting, in an ETL system, one or more source data endpoints for data extraction, the one or more source data endpoints including at least some data other than the source data;

selecting one or more target data endpoints for data loading;

mapping at least one of the identified operations defined in the spreadsheet, the at least one of the identified operations comprising at least one spreadsheet function of the spreadsheet application environment to one or more ETL operations of the ETL system for data transformation, the one or more ETL operations of the ETL system being one or more functions of the ETL environment; and building the ETL data transformation flow, the ETL data transformation flow defining extraction from the selected one or more source data endpoints, transformation based on the one or more ETL operations, and loading to the selected one or more target data endpoints; and executing the created ETL data transformation flow, the executing performing the extraction from the selected one or more source data endpoints, including extraction of the at least some data other than the source data, transformation based on the one or more ETL operations, including transformation of the at least some data other than the source data, and loading to the selected one or more target data endpoints.

16. The computer program product of claim 15, wherein the identified operations comprise at least one selected from the group consisting of: (i) operations of a spreadsheet column that includes cells with a common formula using different cell references, (ii) operations of a spreadsheet row that includes cells with a common formula using different cell references, and (iii) operations of individual cells that do not include a formula common to other cells of the spreadsheet.

17. The computer program product of claim 15, wherein the automatically creating comprises:
    building a plurality of transformation pipelines from the identified operations, each transformation pipeline of the plurality of transformation pipelines being associated with an operation of the identified operations, a respective target endpoint, and a respective at least one source data endpoint;
    presenting the built plurality of transformation pipelines to a user; and
    receiving a selection from the user of at least one built transformation pipeline of the built plurality of transformation pipelines, wherein the at least one identified operation for the mapping to the one or more ETL operations is the at least one identified operation from which the at least one built transformation pipeline is built.

18. The computer program product of claim 17, wherein the method further comprises storing the built plurality of transformation pipelines as metadata, and wherein the building the ETL data transformation flow comprises retrieving from storage the at least one built transformation pipeline, and converting the at least one built transformation pipeline to an execution format recognized by the ETL system.

19. The computer program product of claim 15, wherein the selected one or more target data endpoints comprises at least one target data endpoint in the ETL system.

20. The computer program product of claim 15, wherein the selected one or more target data endpoints comprises a graphical user interface to which data loads of the created ETL data transformation flow are directed.

* * * * *